United States Patent
Fan et al.

(10) Patent No.: US 6,627,035 B2
(45) Date of Patent: Sep. 30, 2003

(54) GAS DIFFUSION ELECTRODE MANUFACTURE AND MEA FABRICATION

(75) Inventors: Qinbai Fan, Chicago, IL (US); Siem Le, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 21 days.

(21) Appl. No.: 09/768,531

(22) Filed: Jan. 24, 2001

(65) Prior Publication Data

US 2002/0134501 A1 Sep. 26, 2002

(51) Int. Cl.[7] .............. B32B 31/20; B05D 5/12; H01M 4/00
(52) U.S. Cl. .............. 156/308.2; 156/308.6; 427/115; 429/27
(58) Field of Search .............. 427/115; 429/FOR 27; 156/308.2, 308.6

(56) References Cited

U.S. PATENT DOCUMENTS

| | | |
|---|---|---|
| 3,553,024 A | 1/1971 | Fishman |
| 3,935,029 A | 1/1976 | Baker et al. |
| 4,185,131 A * | 1/1980 | Goller et al. ............ 427/115 |
| 4,337,140 A | 6/1982 | Solomon |
| 4,339,325 A | 7/1982 | Solomon et al. |
| 4,350,610 A | 9/1982 | Jung et al. |
| 4,849,253 A | 7/1989 | Maricle et al. |
| 5,474,857 A | 12/1995 | Urchida et al. |
| 5,584,977 A | 12/1996 | Bachot et al. |
| 5,776,539 A | 7/1998 | Watanabe et al. |
| 5,783,325 A | 7/1998 | Cabasso et al. |
| 5,879,828 A | 3/1999 | Debe et al. |
| 5,910,378 A | 6/1999 | Debe et al. |
| 5,935,643 A | 8/1999 | Song et al. |
| 5,998,057 A * | 12/1999 | Koschany et al. ............ 427/115 |
| 6,042,959 A | 3/2000 | Debe et al. |

FOREIGN PATENT DOCUMENTS

| | | |
|---|---|---|
| EP | 0 869 568 A1 | 10/1998 |
| EP | 0 928 036 A1 | 7/1999 |
| EP | 1 065 739 A1 | 1/2001 |

* cited by examiner

*Primary Examiner*—Michael W. Ball
*Assistant Examiner*—Justin Fischer
(74) *Attorney, Agent, or Firm*—Mark E. Fejer

(57) ABSTRACT

A method for producing a gas diffusion electrode in which a slurry of carbon black, alcohol, water and a tetrafluoroethylene emulsion is applied as a layer a non-Teflonized carbon cloth substrate, which is then heated to remove water. The dried coated carbon cloth is then rolled followed by heating to remove wetting agents present in the tetrafluoroethylene emulsion. The coated carbon cloth is then cooled and rolled again to produce the final end product.

10 Claims, 7 Drawing Sheets

E-Tek x80

IGT (X80)

GAS DIFFUSION ELECTRODE MANUFACTURE AND MEA FABRICATION

BACKGROUND OF THE INVENTION

1. Field of the Invention

This invention relates to polymer electrolyte membrane fuel cells and methods for producing components thereof. More particularly, this invention relates to a method for producing gas diffusion electrodes and membrane electrode assemblies for polymer electrolyte membrane fuel cells.

2. Description of Prior Art

A polymer electrolyte membrane fuel cell is an electrochemical device comprising an anode electrode, a cathode electrode and an electrolyte in the form of a thin polymeric membrane disposed between the anode electrode and the cathode electrode. Individual polymer electrolyte membrane fuel cells or fuel cell units are stacked with bipolar separator plates separating the anode electrode of one fuel cell unit from the cathode electrode of an adjacent fuel cell unit to produce polymer electrolyte membrane fuel cell stacks. Conventionally, the electrodes are gas diffusion electrodes that are bonded or applied on either side of the solid polymer electrolyte membrane to produce a membrane/electrode assembly (MEA).

The gas diffusion electrode is a porous, electron-conductive layer that is disposed between a catalyst layer and the bipolar separator plates (current collectors). The porous nature of the material comprising the electrode ensures effective diffusion of each reactant gas to the catalyst on the membrane/electrode assembly. In addition, the porous nature of the material also assists in water management during operation of the fuel cell. Too little water causes a high internal resistance due to low humidification of the polymeric membrane while too much water causes flooding of the fuel cell by the water.

A variety of methods for producing gas diffusion electrodes are known including filtration, powder vacuum deposition, spray deposition, electrodeposition, casting, extrusion, and rolling and printing. However, some of these methods are very difficult to scale up to fabricate gas diffusion electrodes with good surface conductivity, gas permeability, uniformity, and long-term hydrophobic and hydrophilic stability.

U.S. Pat. No. 5,998,057 teaches a porous gas diffusion electrode for polymer electrolyte membrane fuel cells which is produced by impregnating a carbonized fiber nonwoven fabric with a mixture of soot suspension and polytetrafluoroethylene suspension, drying the impregnated material at elevated temperatures followed by sintering. A catalytically active layer comprising a noble metal catalyst on a carbon carrier mixed with an ion-conducting polymer in solution or suspension is applied to the sintered fabric. The gas diffusion electrode is combined with a polymer electrolyte membrane so as to form an MEA by pressing the electrode onto the membrane so as to provide contact between the membrane and the catalytically active layer.

U.S. Pat. No. 5,783,325 teaches a method for preparation of gas diffusion electrodes for use in solid polymer electrolyte fuel cells in which an anistropic gas diffusion layer made of a porous carbon matrix through which carbon particles and poly(vinylidene fluoride) are distributed such that the matrix is homogeneously porous is prepared by casting with a doctor knife onto a carbon substrate a blend of poly(vinylidene fluoride) and carbon black dissolved in a solvent for the poly(vinylidene fluoride) and carbon black to form a layer of film on a carbon substrate resulting in penetration of the mixture into at least a portion of the carbon substrate, coagulating the film in a coagulation liquid that is a non-solvent for the poly(vinylidene fluoride) and carbon black, and removing the coagulation solvent. A catalytic layer comprising a coagulated aqueous ink suspension containing catalytic carbon particles and a thermal plastic polymer is painted onto the surface of the gas diffusion layer.

U.S. Pat. No. 5,935,643 teaches a method for manufacturing an electrode for phosphate-type fuel cells in which an electrocatalyst slurry is coated upon an electrode support which is obtained by waterproofing and sintering carbon paper, dried at high temperature in an inert atmosphere and subjected to a rolling process and then to a sintering process.

U.S. Pat. No. 5,474,857 teaches a solid polymer electrolyte in which the reaction area of the electrode is increased by uniformly dispersing and bonding a solid polymer electrolyte and a catalyst and the ability of gas feeding to the reaction site is improved by adding a fluoropolymer so that the catalyst is not excessively loaded. The electrode, which is provided on at least one side of the solid polymer electrolyte, is formed by coating on one side of a gas diffusible layer a mixed dispersion of a noble metal catalyst, a carbon fine powder and a colloidal dispersion of a solid polymer electrolyte.

U.S. Pat. No. 4,849,253 teaches an electrochemical cell electrode produced by applying a plurality of thin layers of a catalyst material onto a substrate, filtering and compacting the layers between additions, until a desired amount is achieved. The catalyst-bearing substrate is then dried and sintered to form an electrode.

To provide sufficient ionic conductivity within the catalyst layer of the gas diffusion electrode, the platinum/carbon powder catalyst must be intimately intermixed with liquid ionomer electrolyte. Thus, the catalyst layer may be described as a Pt/C/ionomer composite that achieves proton mobility while maintaining adequate electronic conductivity to result in a low contact resistance with the gas diffusion layer. To reduce overall costs, it is desired to maintain Pt metal loading at a minimum.

The proton conducting polymeric membrane is the most unique element of the polymer electrolyte membrane fuel cell. The membrane commonly employed in most recent polymer electrolyte membrane fuel cell technology developments is made of a perfluorocarbon sulfonic acid ionomer such as NAFION® by DuPont. W. L. Gore, Asahi Chemical and Glass (Japan) produce similar materials as either commercial or developmental products. These membranes exhibit very high long-term chemical stability under both oxidative and reductive environments due to their Teflon-like molecular backbone. This membrane, when wet with water, can serve at the same time as an effective gas separator between fuel and oxidant. If allowed to dry out, gases can pass through the membrane and the fuel cell can be destroyed as hydrogen and oxygen combine in catalytic combustion.

The main step for fabricating MEAs is to catalyze either the gas diffusion electrode or the polymer electrolyte membrane. In either case, an electrode backing is placed on each side of the polymer electrolyte membrane with a catalyst/electrolyte ionomer layer between each gas diffusion electrode and the membrane to form a membrane electrode assembly. Currently, two methods by various developers are used to put the catalyst/electrolyte ionomer layer between the gas diffusion electrode and the polymer electrolyte membrane. One is a direct deposition method; the other is an indirect deposition method.

In the direct deposition method, the catalyst/electrolyte ionomer layer is directly applied to the polymer electrolyte membrane by coating methods, chemical vapor deposition (CVD), physical vapor deposition (PVD), or electrochemical deposition (ECD). The CVD, PVD and ECD methods are not useful in a fuel cell with a gas phase fuel because these methods cannot deposit the electrolyte ionomer with the catalyst particles, as a result of which there is no electrolyte between the catalyst particles in the gas phase. Electrochemical deposition has been used to make MEAs for a direct methanol fuel cell, in which the electrolyte ionomer is not necessary to exist in the catalyst layer because of the liquid phase fuel. In gas phase fuel cells, the catalyst ink can be directly deposited on the polymer electrolyte membrane surface if the membrane does not wrinkle after touching the solvent in the catalyst ink. Coating methods, such as painting, spraying, screen-printing, etc. are generally used to put catalyst/ionomer ink on the membrane surface. These methods create good contact between the catalyst layer and the electrolyte membrane. To maintain good contact in the three phase (gas/electrolyte/catalyst) area, crack-free gas diffusion backing is required to support the catalyst layer. In the fuel cell, the ionic impedance is a main loss in comparison to electrical loss. In other words, the contact between the gas diffusion layer and the catalyst layer is for current collection, that is, electrical connection. The contact between the catalyst layer and the electrolyte membrane is for ionic transportation. As is seen, the direct deposition method reduces the ionic impedance in the fuel cell. The requirement for this method is that the polymer electrolyte membrane must not be sensitive to the ink solvent. A certain clamp force must also be maintained to reduce the electrical resistance between the catalyst layer and the gas diffusion backing.

In indirect deposition methods, the catalyst layer is deposited on a substrate that then decals to the electrolyte membrane or on the gas diffusion electrode that then sandwiches to the electrolyte membrane by hot pressing, hot rolling, or laminating. In one known implementation of the decal method, a layer of catalyst ink is brushed onto a Teflon-coated fiber substrate. After drying, the ink layer with the substrate is hot pressed on a NAFION electrolyte membrane. Although resulting in good contact between the catalyst layer and the electrolyte membrane, this method is limited to producing only small electrodes due to the problem of catalyst releasing from the substrate. In addition, it is very difficult to scale up. A certain clamp force is also required to reduce the electrical resistance between the catalyst layer and the gas diffusion layer.

Catalyst ink deposition on a gas diffusion electrode is another method of producing an MEA. In this method, catalyst ink is deposited onto the gas diffusion electrode which is then either hot-pressed, hot-rolled, or laminated to the polymer electrolyte membrane. This method produces MEAs having good electrical contact between the gas diffusion electrode and the catalyst layer as well as the catalyst layer and the electrolyte membrane. The critical requirement with this method is that the gas diffusion electrode must be crack-free; otherwise the catalyst ink will be lost in the cracks after deposition of the gas diffusion electrode. Consideration must also be given to optimization of the hot-pressing, hot-rolling or laminating force so as to preclude crushing the gas diffusion electrode.

SUMMARY OF THE INVENTION

Accordingly, it is an object of this invention to provide a method for producing gas diffusion electrodes and MEAs employing such gas diffusion electrodes that addresses the problems attendant to conventional methods as discussed hereinabove.

These problems are addressed by the method of this invention in which a gas diffusion electrode is produced by mixing a slurry comprising carbon black, at least one alcohol and water with a tetrafluoroethylene (TEFLON®) emulsion to form a tetrafluoroethylene slurry which, in turn, is applied to a carbon cloth substrate that has not been treated with tetrafluoroethylene, forming a coated carbon cloth. The coated carbon cloth is then heated to a temperature suitable for driving off water, producing a substantially water-free, or dried, coated carbon cloth. The substantially water-free coated carbon cloth is then rolled to substantially eliminate cracks and then heated to a temperature suitable for removing wetting agents from the tetrafluoroethylene emulsion. This water-free and wetting agent-free coated carbon cloth is then cooled, forming a cooled coated carbon cloth. The cooled coated carbon cloth is then rolled to produce the end product gas diffusion elctrode.

In contrast to known methods for producing gas diffusion electrodes which require the impregnation of the carbon cloth with tetrafluoroethylene, the method of this invention does not require such impregnation, or Teflonization, of the carbon cloth. Indeed, impregnation of the carbon cloth in accordance with known methods is undesirable because it results in higher internal resistance of the fuel cell. In addition, the tetrafluoroethylene layer on the carbon cloth has been found to degrade over time. And, as a result of this loss of tetrafluoroethylene coating effectiveness, the hydrophobicity of the backing reduces with time of the fuel cell operation. We have found, however, that even though the carbon cloth is not impregnated with tetrafluoroethylene, the carbon cloth is nevertheless hydrophobic when the sintering temperature reaches 300° C. And, because there is no impregnation of the carbon cloth with tetrafluoroethylene, there is no issue of changes in hydrophobicity over time.

BRIEF DESCRIPTION OF THE DRAWINGS

These and other objects and features of this invention will be better understood from the following detailed description taken in conjunction with the drawings wherein.

DESCRIPTION OF PRESENTLY PREFERRED EMBODIMENTS

Figure 1:
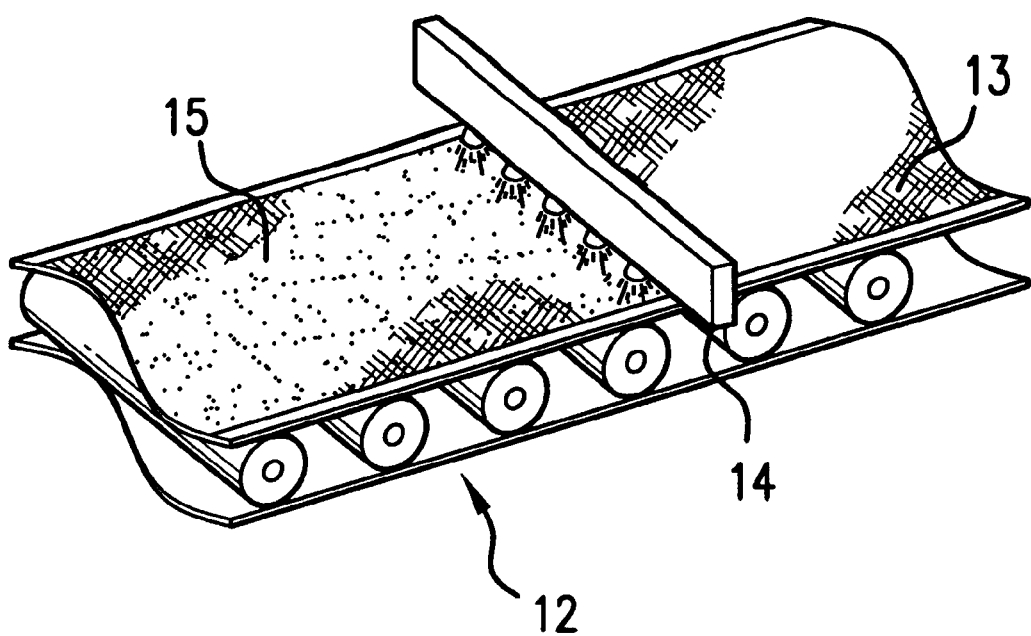
FIG. 1 is a diagram of an air atomizing system for catalyzing a gas diffusion electrode in accordance with one embodiment of this invention.

A gas diffusion electrode is produced in accordance with the method of this invention by mixing a slurry comprising carbon black, at least one alcohol and water with a tetrafluoroethylene emulsion to form a tetrafluoroethylene carbon black slurry which, in turn, is applied to a carbon cloth substrate devoid of tetrafluoroethylene, forming a coated carbon cloth. In accordance with one preferred embodiment, the carbon black slurry is applied to the carbon cloth substrate by tape casting, also known as doctor blading and knife coating. The process utilizes a scraping blade, known as the "doctor" for the removal of excess substances from a moving surface being coated, in the instant case the carbon cloth substrate. The coated carbon cloth is then heated to a temperature suitable for driving off water, preferably about 107° C. to about 110° C., producing a substantially dry coated carbon cloth. The substantially dry coated carbon cloth is then rolled, preferably through two rolls with a certain pressure, to substantially eliminate cracks. The wetting agents in the tetrafluoroethylene emulsion help to smooth the coating layer. The force on the carbon cloth from the rolls is variable according to the thickness of the carbon black layer. The rolled carbon cloth is then heated to a temperature suitable for removing wetting agents from the 121A/120 FEP emulsion, about 310° C. to about 350° C. This water-free and wetting agent-free coated carbon cloth is then cooled, forming a cooled coated carbon cloth. The cooled coated carbon cloth is then rolled, resulting in the final product.

The coating on the carbon cloth should be crack free after drying. The cracking on the carbon cloth is related to the stress in drying the slurry. The stress in drying the carbon cloth depends on the composition of the carbon black slurry, such as binder, carbon black, and the liquid phase. However, the coating conductivity must be considered when optimizing the slurry composition. The coating requires high surface conductivity with a good hydrophilic/hydrophobic ratio and with less or without cracking. Surface conductivity is measured, according to ASTM C-611, using two gold plated probes that are placed parallel to each other on the gas diffusion electrode surface at a distance of 1.5 cm. Weights are placed on top of the probes to provide a certain pressure. The resistance may be measured using a QuadTech 1880 Milliohmmeter. Gold plated copper and POCO® graphite, available from Poco Graphite, Inc. in Decatur, Tex. were used as references.

In addition to surface conductivity, other diagnostic methods utilized in the evaluation of gas diffusion electrodes include the water uptake method, Gurley method and surface uniformity examination. Hydrophobicity is an element of considerable importance in gas diffusion electrode development. Wettability is also representative of the hydrophobic/hydrophilic properties of gas diffusion electrodes. Because the gas diffusion electrode is a porous medium, a quick visual test may be used to examine the wettability of the electrode. This test may be carried out by spraying deionized water on the electrode surface to see whether water is imbibed by the gas diffusion electrode. A more precise technique is to use the water uptake method in which the gas diffusion electrode is immersed in hot water for a time at the fuel cell operating temperature. A constant water uptake over time is required for a good gas diffusion electrode.

Figure 3:
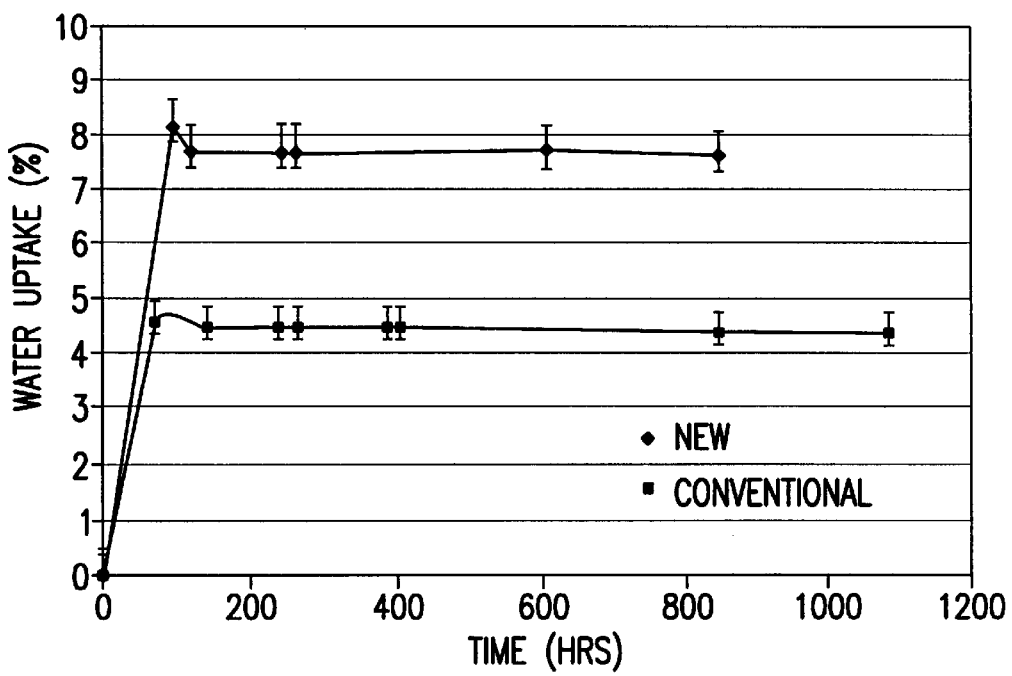
FIG. 3 is a diagram showing the results of water uptake tests conducted on gas diffusion electrodes produced in accordance with the method of this invention and in accordance with known methods.

Water uptake is an important property of the gas diffusion electrode because it affects gas diffusion through the electrode and humidification of the electrolyte jonomer in the catalyst layer and the electrolyte membrane. Water uptake of the gas diffusion electrode will also affect the design of other elements of the polymer electrolyte membrane fuel cell including the flow channel design of the bipolar plates, the structure of the MEAs, and the type of electrolyte membranes. Although there is no standard for water uptake by gas diffusion electrodes, constant water uptake is required to reduce the fuel cell decay rate. FIG. 3 shows the water uptake comparison for a gas diffusion electrode made in accordance with the method of this invention and an E-Tek gas diffusion electrode, available from E-Tek, Inc., in Natick, Mass. As can be seen, the gas diffusion electrode produced in accordance with the method of this invention has the highest water uptake, but is constant after 800 hours. The highest water uptake was deemed to be due to the tetrafluoroethylene content in the carbon cloth and the carbon black layer. As previously indicated, there is no tetrafluoroethylene in the carbon cloth of a gas diffusion electrode produced in accordance with the method of this invention. And, as previously indicated, no teflonization of the carbon cloth eliminates the property changes of the Teflon coating versus fuel cell operation time.

Figure 4:
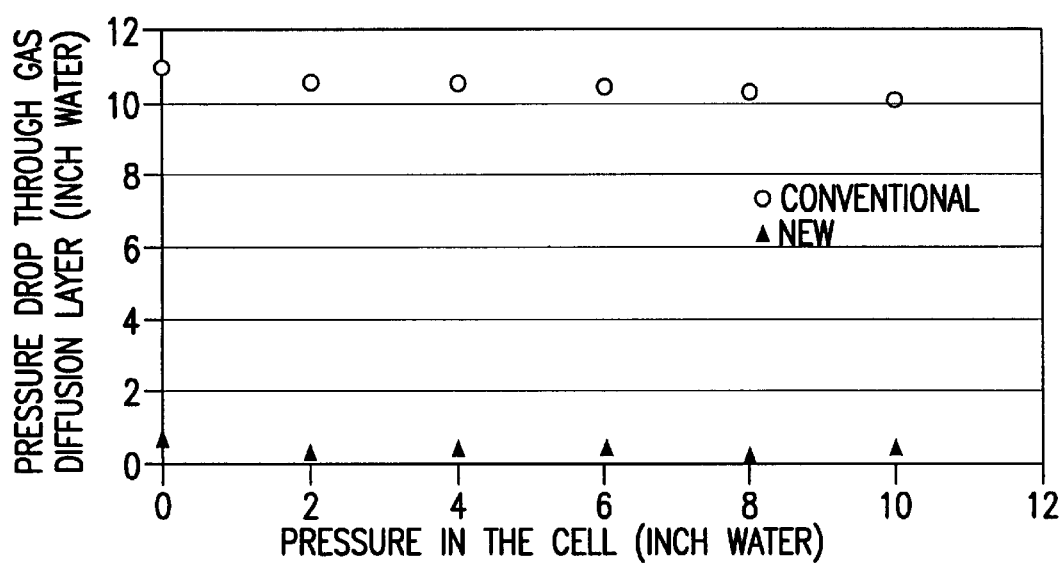
FIG. 4 is a diagram showing the pressure drop as measured by the Gurly method through gas diffusion electrodes produced in accordance with the method of this invention and in accordance with known methods.

The Gurley method is used to measure the resistance of the gas diffusion electrode to the passage of air. The air from a cylinder controlled by a mass-flow controller is passed through a U-shaped pressure drop device to a testing cell. The air outlet of the cell flows to another U-shaped pressure drop device. The U-shaped glass tubes of the U-shaped pressure drop devices are filled with deionized water colored by a drop of red ink. The difference in pressure drop between the two U-shaped devices correspond to the resistance of the gas diffusion electrode. The Gurley method is not a standard method, as a result of which a comparison experiment is normally utilized to measure the gas diffusion resistance. FIG. 4 shows the pressure drop through different gas diffusion electrodes using the Gurley method. As can be seen, gas diffusion electrodes produced in accordance with the method of this invention have the lowest pressure drop, i.e. the lowest gas diffusion resistance. The E-Tek gas diffusion electrode showed the highest gas diffusion resistance.

Figure 5A:
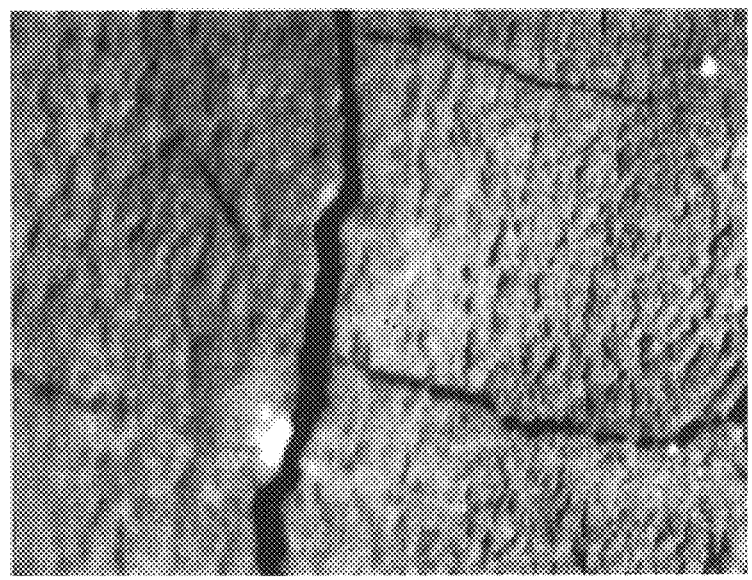
FIGS. 5a and 5b are microscopic images of known gas diffusion electrodes and gas diffusion electrodes produced in accordance with the method of this invention, respectively.
Figure 5B:
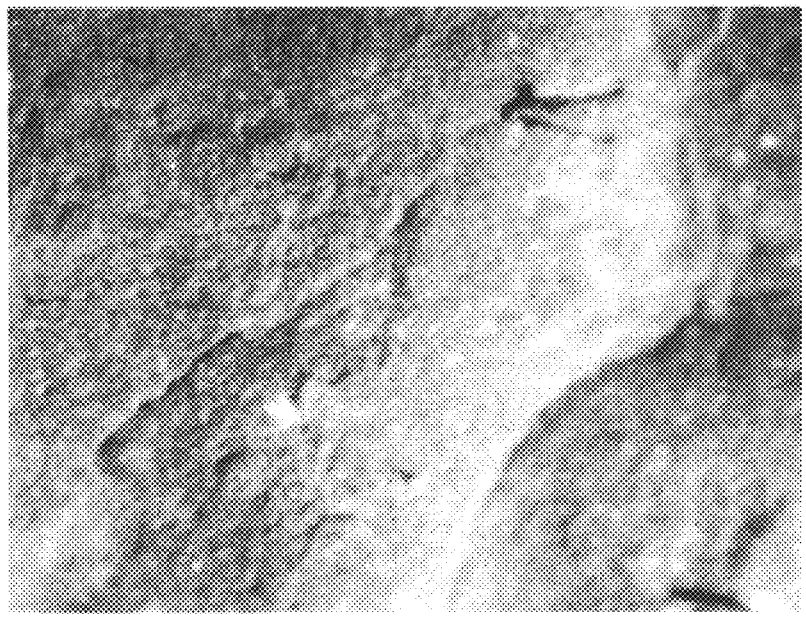

Surface uniformity is also an important characteristic of a gas diffusion electrode so as to provide an effective support to the catalyst layer of the MEA. FIGS. 5a and 5b show microscopic images of a commercial gas diffusion electrode (5a) and a gas diffusion electrode produced in accordance with the method of this invention (5b). As can be seen, the gas diffusion electrode produced in accordance with the method of this invention shows better uniformity.

The percentage of tetrafluoroethylene in the carbon black slurry of the method of this invention is preferably in the range of about 30% to about 45% by weight of the slurry. The carbon black loading on the carbon cloth surface is preferably in the range of about 4 to 6 mg/cm$^2$. The carbon black slurry may be prepared with XC-72R carbon black available from Cabot Corporation and a 1:1 ratio of FEP 121A and 120 available from DuPont. First, the carbon black is mixed well with isopropanol, glycerol, and deionized water after which the 121A/120 FEP emulsion is added. Table 1 shows the surface resistance of several gas diffusion electrodes, including some produced employing carbon black slurry compositions in accordance with the method of this invention.

TABLE 1

| | Gold plated copper | POCO Graphite | Elat (E-Tek) | New Electrodes | |
|---|---|---|---|---|---|
| | | | | 40% Teflon | 35% Teflon |
| Surface Resistance ($\Omega$) | 0.09 | 0.14 | 1.33 | 0.91–1.12 | 0.76–0.92 |

As can be seen, of the electrodes produced in accordance with the method of this invention, those having 35% tetrafluoroethylene had the lowest surface resistance. Low surface resistance provides a good electronic connection between catalyst particles at the interface of the carbon black layer and the catalyst layer as a result of which the total IR and the charge transfer resistance of the fuel cell are reduced.

In accordance with one embodiment of the method of this invention, a catalyst is applied to the surface of the gas diffusion electrode. The key to scale up of the production of membrane/electrode assemblies is the catalyzation of the gas diffusion electrode or the polymer electrolyte membrane with little catalyst ink waste. The method for applying catalyst in accordance with the method of this invention coupled with the gas diffusion electrode production line derived from the method of this invention enable the manufacture of any size MEA with high performance and stability. Full size MEAs produced in accordance with the method of this invention have achieved better reproducible performance and sustained life performance compared to conventional MEAs. This has been verified in sixty 250 cm$^2$ and 300 cm single cell tests and a 300$^2$ cm 4-cell CO-tolerant performance decay rate of the MEAs produced in accordance with the method of this invention is less than 5 mV/1000 hours.

The catalyst layer is formulated from ink consisting of platinum-ruthenium catalyst for the anode and platinum black for the cathode with 10% to 25% NAFION ionomer, water, isopropanol and glycol to an optimized viscosity. The glycol in the ink increases the ink viscosity and reduces the catalyst layer dry speed to eliminate any cracks on the gas diffusion layer after application of the ink.

Catalyzation of the gas diffusion electrode is a method for distributing catalysts uniformly without sacrificing fuel cell performance. Although screen printing and spray methods are widely used in MEA fabrication, catalyst recovery from the printing or spray device and uniform distribution on the substrate are still problems.

A screen printing process was first used to apply catalyst to the surface of the gas diffusion electrode. This technique supplies uniform force on the screen and distributes the catalyst evenly. A screen using a tetrafluoroethylene frame, which can recover any unused catalyst from the tetrafluoroethylene frame and the screen, was made to catalyze the gas diffusion layer. However, a large volume of catalyst ink was required to screen print the catalyst onto the gas diffusion layer and the catalyst washed out from the screen was difficult to recover.

In accordance with one preferred embodiment of the method of this invention, the catalyst is applied to the gas diffusion layer by a spray method in which, to obtain a uniformly distributed catalyst layer, an x-y recorder is used to control the spray rate. The method provides a uniform spray which typically takes only about 30 seconds for a 300 cm$^2$ gas diffusion layer. FIG. 1 shows a diagram of an automatic air atomizing spray system suitable for use in the method of this invention. The system comprises a conveyor 12 which conveys a layer of carbon cloth backing 13 beneath a series of spray nozzles 14 which automatically deposit catalyst ink 15 onto carbon cloth backing 13. The test system for applying the catalyst utilized VAU Autojet air atomizing nozzles, which are available from Spraying Systems Company in Wheaton, Ill. These nozzles provide independent control of the catalyst ink, atomizing air, and fan air pressures for fine tuning capacity, drop size and spray pattern. With the fan air line in operation, a flat spray pattern is produced. The catalyst ink vessel is pressurized to control the deposition rate and eliminate nozzle clogging. The most important function of the fan line is to dry the extra solvent before the drops reach the gas diffusion layer. The controlled evaporation of the ink results in a crack-free catalyst coating. One spray nozzle with a flat pattern has a 9-inch spray coverage. The system can be easily incorporated with an automatic rolling system to make MEAs.

In accordance with one embodiment of this invention, the gas diffuision electrodes produced in accordance with the method of this invention are hot pressed, hot rolled or laminated to the polymer electrolyte membrane to produce a membrane/electrode assembly. By way of example, NAFION 115, available from DuPont, was cleaned using boiled deionized water, boiled in 1 to 3 N nitric acid, washed in boiling deionized water, boiled in 1 N sulfuric acid, boiled in deionized water twice, and stored in deionized water. The catalyzed gas diffusion electrodes were dried at 110° C. to remove water and solvent in the catalyst layer. The Nafion membrane was then sandwiched between two dried gas diffusion electrodes and then hot pressed, hot rolled or laminated at a temperature of about 120° C. to about 130° C. at a pressure of about 150 to 200 psi, The temperature and the pressure make the ionomer in the catalyst layer soft and adhesive to provide a good bind between the gas diffusion layer and the catalyst layer as well as the catalyst layer and the Nafio membrane.

Figure 2:
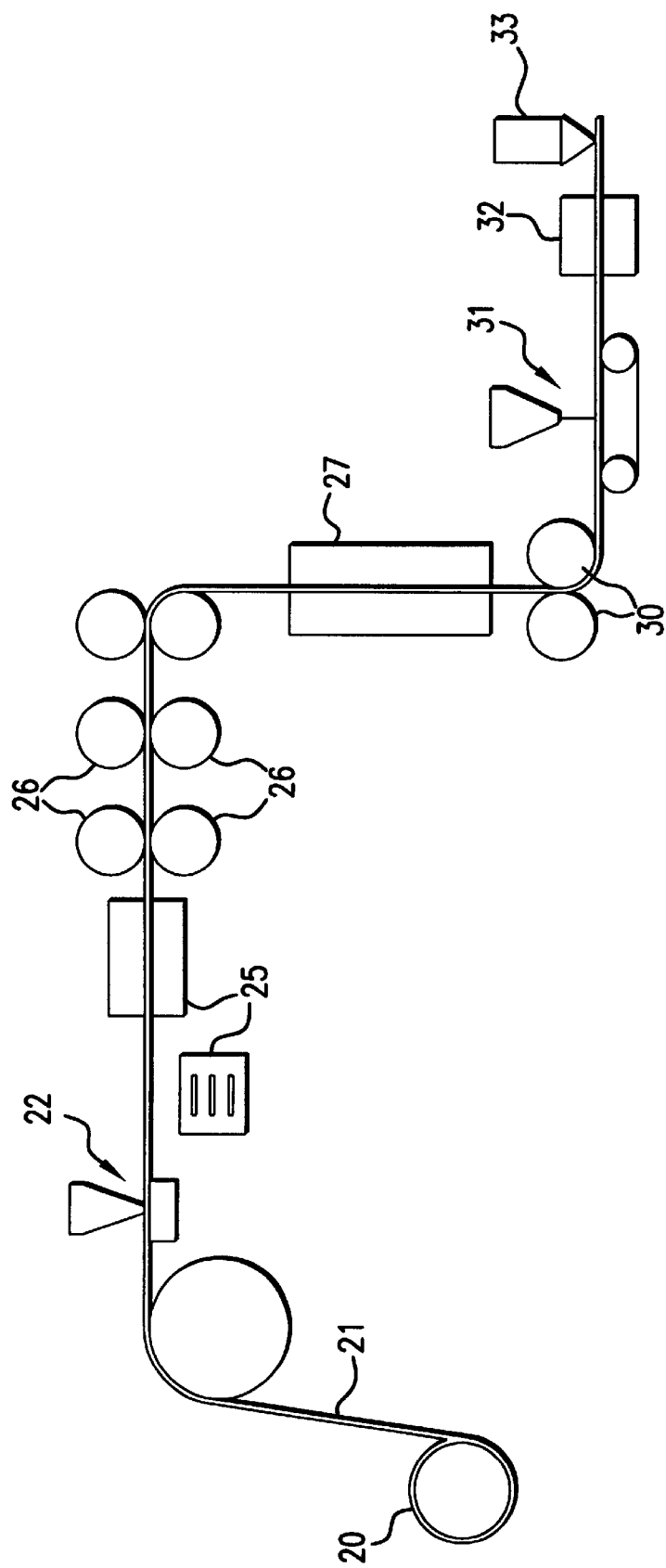
FIG. 2 is a diagram of a process line for producing membrane electrode assemblies in accordance with one embodiment of this invention.

FIG. 2 is an exemplary diagram of a production line for producing MEAs in accordance with the method of this invention. The line comprises an unwind roll 20 from which a carbon cloth 21 is unrolled and passed through a tape caster 22 at which point the Teflonized slurry of carbon black, alcohol, water and tetrafluoroethylene emulsion is applied to carbon cloth 21. The coated cloth is then dried by dryers 25 to remove water. The water-free coated carbon cloth is passed through rollers 26 for rolling followed by heating in an oven 27 to remove wetting agent. The wetting agent-free carbon cloth is rolled again by rollers 30 and conveyed through autojet atomizing system 31 for application of the catalyst ink. The catalyst layered coated carbon cloth is passed through oven 32 in which it is dried to remove solvent. Thereafter, it is cut by die cutter 33 to the desired size.

Figure 6:
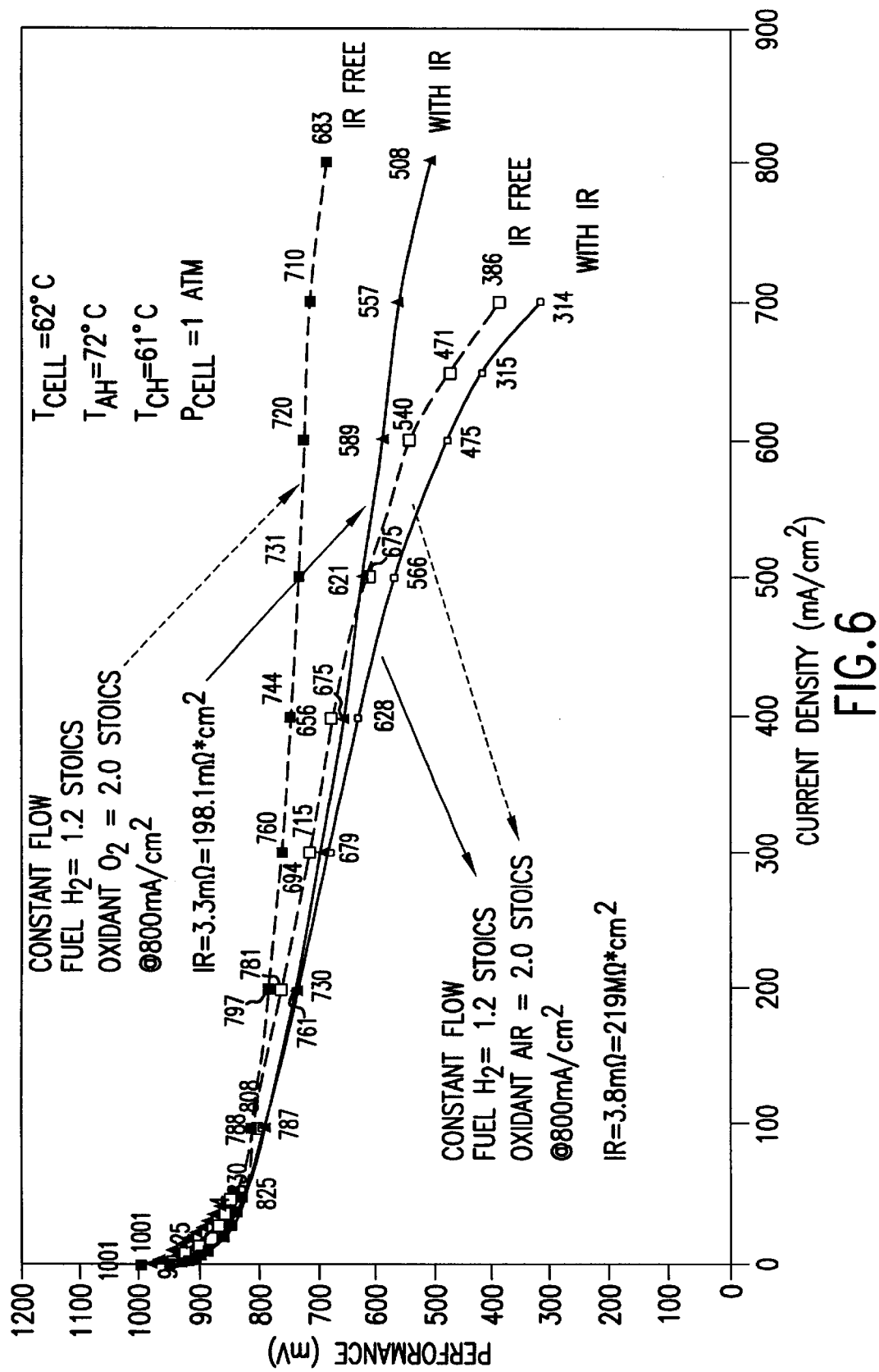
FIG. 6 is a diagram showing a performance comparison of gas diffusion electrodes produced in accordance with the method of this invention using oxygen and air.

MEAs produced in accordance with the method of this invention were evaluated using a performance test for mass transfer limitation at the cathode side, a scale up test, and a synthetic reformate test. In the performance test for mass transfer limitation, mass transfer is limited at the cathode side due to the use of air. Thus, the performance drop between oxygen and air is a rule of thumb for examining the gas diffusion electrode. FIG. 6 shows the performance comparison of MEAs produced in accordance with the method of this invention using $O_2$ and air as oxidants, respectively. Table 2 is a performance summary of the MEAs at 400 mA/cm$^2$.

TABLE 2

Summary of Fuel Cell Performance Comparison at 400 mA/cm$^2$

| Performance (mV) | E-Tek MEA (58 cm$^2$) | New MEA (58 cm$^2$) | New MEA (300 cm$^2$) (80% H$_2$ + 20% CO$_2$ + 2.5 ppm CO) |
|---|---|---|---|
| H$_2$/O$_2$ after IR correction | 766 | 744 | 773 |
| H$_2$/Air after IR correction | 671 | 675 | 704 |
| Difference | 85 | 69 | 69 |
| H$_2$/Air without IR correction | 564 | 628 | 607 |
| IR loss | 107 | 47 | 97 |

As can be seen from Table 2, the MEAs (New MEA) produced in accordance with the method of this invention and using NAFION 115 (5 mils thickness) have the lowest performance drop due to the mass transfer difference between oxygen and air. The IR loss is also the lowest. It should also be noted that the full size MEA has a high IR loss using synthetic reformate (80% H$_2$+20% CO$_2$+2.5 ppm CO), which is due to the mass transfer and charge transfer limitations at the anode side with the impurities of CO$_2$ and CO.

Figure 7:
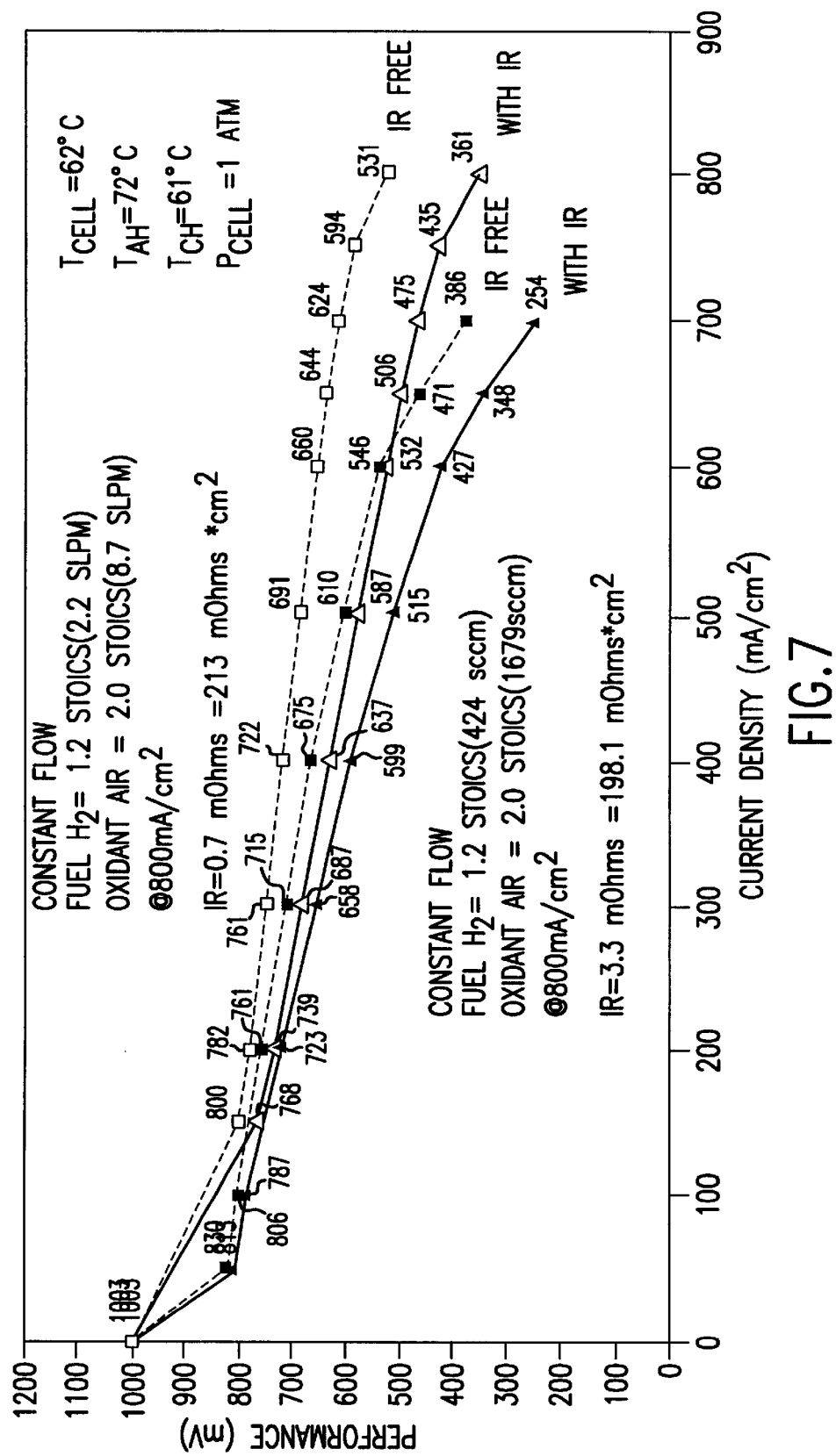
FIG. 7 is a diagram showing a performance comparison of MEAs produced in accordance with the method of this invention.

The scale up test is designed merely to evaluate the performance of scaled up MEAs compared to laboratory scale MEAs. Ideally, performance is reproducible when the MEA is scaled up. FIG. 7 shows the results of test conducted on 60 and 300 cm$^2$ single cells and fuel cell performance of the 60 and 300 cm$^2$ fuel cells is summarized in Table 3.

TABLE 3

Summary of Fuel Cell Performance with 60 and 300 cm$^2$ Active Area

| Active Area (cm$^2$) | 58 | 250 | 300 |
|---|---|---|---|
| Performance at 400 mA/cm$^2$ | 599 | 612 | 637 |
| IR (mOhms.cm$^2$) | 198 | 191 | 213 |
| Performance at 400 mA/cm$^2$ after IR correction | 675 | 688 | 722 |
| IR loss at 400 mA/cm$^2$ | 76 | 76 | 85 |

Figure 8:
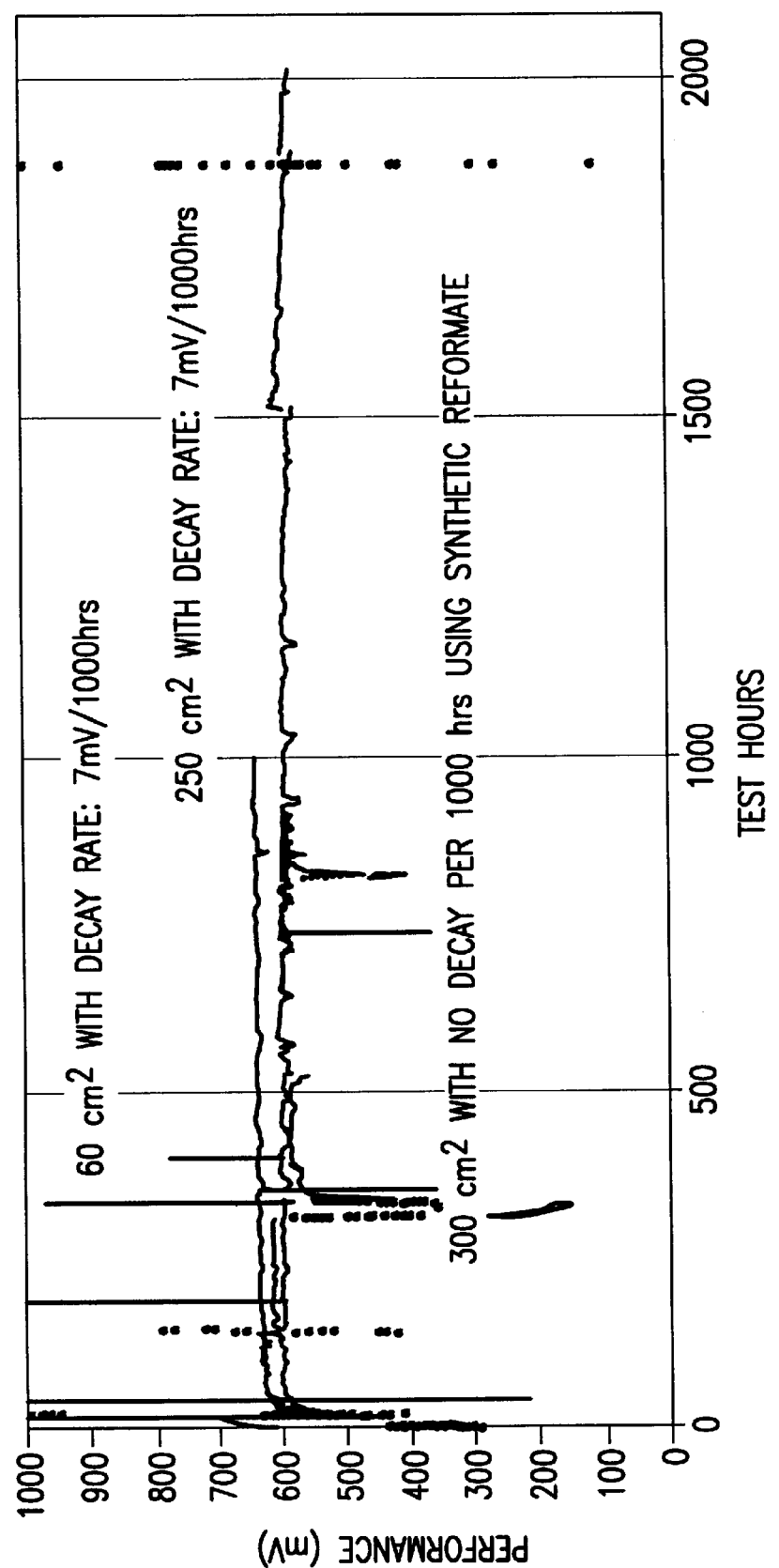
FIG. 8 is a diagram showing the results of lifetime tests on scaled up MEAs produced in accordance with the method of this invention.

From Table 4, it can be seen that there is no difference between cells with 58, 250 and 300 cm$^2$ active areas. In addition, the lifetime performance tests, the results of which are shown in FIG. 8, show substantial cell stability. The decay rate is less than 5 mV/1000 hours. In FIG. 8, the MEA having the 300 cm$^2$ active area is a CO tolerant MEA made using a Pt-Ru (50/50) catalyst. The fuel was a synthetic reformate. As can be seen, the performance was 600 mV at 400 mA/cm$^2$ and very stable.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for producing a gas diffusion electrode comprising the steps of:

mixing a slurry comprising carbon black, at least one alcohol and water with a tetrafluoroethylene emulsion, forming a tetrafluoroethylene slurry;

applying a layer of said tetrafluoroethylene slurry to a carbon cloth substrate devoid of tetrafluoroethylene, forming a coated carbon cloth;

heating said coated carbon cloth to a temperature suitable for driving off water, producing a substantially water-free coated carbon cloth;

rolling said substantially water-free coated carbon cloth to substantially eliminate cracks, resulting in a rolled coated carbon cloth;

heating said rolled coated carbon cloth to a temperature suitable for removing wetting agents from said tetrafluoroethylene emulsion, forming a heated coated carbon cloth;

cooling said heated coated carbon cloth, forming a cooled coated carbon cloth; and rolling said cooled coated carbon cloth, resulting in a gas diffusion electrode.

2. A method in accordance with claim 1, wherein said tetrafluoroethylene slurry comprises in a range of about 30% to about 45% by weight tetrafluoroethylene.

3. A method in accordance with claim 1, wherein a loading of said tetrafluoroethylene slurry on said carbon cloth substrate is in a range of about 4 to about 6 mg/cm$^2$.

4. A method in accordance with claim 1, wherein said rolled coated carbon cloth is heated to a temperature in a range of about 310° C. to about 350° C.

5. A method in accordance with claim 1, wherein said tetrafluoroethylene slurry comprises isopropanol, ethylene, glycol and glycerol.

6. A method in accordance with claim 1 further comprising applying a catalyst to a surface of said gas diffusion electrode.

7. A method in accordance with claim 6, wherein said catalyst is applied to said surface of said gas diffusion electrode by screen printing.

8. A method in accordance with claim 1, wherein at least one said gas diffusion electrode is attached to at least one face of a polymer electrolyte membrane suitable for use in a polymer electrolyte membrane fuel cell, resulting in formation of a membrane/electrode assembly (MEA).

9. A method in accordance with claim 8, wherein said at least one gas diffusion electrode is attached to said at least one face of said polymer electrolyte membrane by a method selected from the group consisting of hot pressing, hot rolling, laminating and combinations thereof.

10. A method in accordance with claim 6, wherein said catalyst is applied to said surface of said gas diffusion electrode by spraying.

* * * * *